United States Patent
Bock

[11] Patent Number: 6,097,122
[45] Date of Patent: Aug. 1, 2000

[54] DRIVE UNIT ELECTRIC MOTOR

[75] Inventor: Olaf Bock, Buehl, Germany

[73] Assignee: Robert Bosch GmbH, Stuttgart, Germany

[21] Appl. No.: 09/157,357

[22] Filed: Sep. 19, 1998

[30] Foreign Application Priority Data

Oct. 22, 1997 [DE] Germany .................. 197 46 595

[51] Int. Cl.[7] .................. H02K 49/00; H02K 49/10
[52] U.S. Cl. .................................. 310/93; 310/103
[58] Field of Search ....................... 310/93, 103, 114

[56] References Cited

U.S. PATENT DOCUMENTS

| 3,382,384 | 5/1968 | Hulls ............................. 310/93 |
| 4,823,035 | 4/1989 | Kudla et al. ..................... 310/68 C |

FOREIGN PATENT DOCUMENTS 0 175 996 A3  4/1986  European Pat. Off. .

Primary Examiner—Clayton LaBalle
Attorney, Agent, or Firm—Michael J. Striker

[57] ABSTRACT

A drive unit has an electric motor having a motor shaft, an electrically disenageable arresting mechanism including a hub connectable with the motor shaft, a plurality of arresting teeth radially projecting from the hub, and at least one arresting pin for electrical disengagement of an element composed of windings of an electrically conductive wire and for disengagement of electrical current, the arresting piece being composed of a magnetically conductive material, the at least one arresting pin being arranged stationary and forming a component of a permanent-magnetic circuit relative to whose poles the arresting teeth are oriented one after the other, the electrically conductive wire being wound to form a magnetic coil which forms at least a partial length of the permanent-magnetic circuit so as to provide a temporary at least partial compensation of a permanent magnetic flux of the permanent-magnetic circuit.

3 Claims, 1 Drawing Sheet

DRIVE UNIT ELECTRIC MOTOR

BACKGROUND OF THE INVENTION

The present invention relates to a drive unit with an electric motor.

The European patent document EP 0 175 996 A3 discloses a drive unit which has an electric motor with a motor shaft, a screw connected with the motor shaft, and a screw wheel engaging with the screw. As shown in FIG. 3 of this reference, both ends of the motor shaft are provided with friction brakes having a first friction element fixedly connected with the longitudinally displaceably supported motor shaft and the second friction elements secured from rotation in one rotary direction by a rotary direction stop. One rotary direction stop operates against left rotation and the other rotary direction stop operates against right rotation. A return drive moment which acts from the screw wheel in one or another rotary direction, for example of a moveable vehicle component, presses through the screw of the turned-off motor a first friction element for producing a frictional connection against the associated second friction element so that the motor shaft is braked. The friction brakes in this case have the disadvantage that the screw transmission composed of the screw and the screw wheel is prone to self locking, and this effect can lead to vibrations, and undesired, arbitrary displacement of the moveable vehicle components such as window panes, slidable roofs, mirrors, seats and the like. The above described friction brakes make difficult an unobjectionable opening of a window or a sliding roof. The components of the sliding roofs which are produced and designed with due regard to these phenomena are expensive.

U.S. Pat. No. 4,823,035 discloses an electric motor with an arresting mechanism which operates against undesirable rotation of the motor shaft and during turning on of the electric motor is disengageable by electric current. The arresting mechanism has a hub which is non rotatably connected with the motor shaft and has four radially projecting arresting teeth, an arresting pin for engaging in gaps between the arresting teeth which is supported radially displaceably relative to the hub and loaded by a spring in direction toward the hub, and an actuator acting for the disengagement and formed as a screw spring of wire. The wire is wound of a shape-memory material or metal and is heatable by an electric current to act, due to the heating, against the helical spring and to pull the arresting pin from a corresponding gap between the arresting teeth. The windings are connected in form of an electric coil with a switch on the one hand and with a brush or an armature winding of the electric motor in series on the other hand, so that the turning-on of the electric motor causes heating of the actuator and thereby finally a disengagement of the arresting mechanism. The turning off of the electric motor leads to a cooling of the actuator and finally to pressing the arresting pin by the helical spring towards the hub, so that the arresting of the pin between the arresting teeth is possible. A mechanical form-locking contact is thereby produced between the pin and at least one of the arresting teeth.

SUMMARY OF THE INVENTION

Accordingly, it is an object of the present invention to provide a drive unit with an electric motor, with a simply actuated locking which is formed contactless and wear-free.

In keeping with these objects and with others which will become apparent hereinafter, one feature of present invention resides, briefly stated, in a drive unit with an electric motor, in which the arresting teeth are composed of magnetically conductive material, the at least one arresting pin is arranged stationarily and forms a component of a permanentmagnetic circuit relative to whose poles the arresting teeth are oriented one after the other, and the electrically conductive wire is wound to form a magnetic coil which constitutes at least a partial length of the permanentmagnetic circuit for a temporary, at least partial compensation of the permanent-magnetic flux of the permanent-magnetic circuit.

When the drive unit is designed in accordance with the present invention it has no sliding surfaces or friction surfaces and no form-locking mechanically operating components. The inventive drive unit is wear-free even when the wear from brushes of the motor is not avoidable.

In accordance with a further feature of present invention, the permanent-magnetic circuit has a pole pair with a north pole and a south pole, and the arresting teeth are angularly projectingly oriented from the hub so that they simultaneously form the pairs which are oriented toward the pole pair. With this design, the construction of the inventive drive unit is very simple.

In accordance with still a further feature of present invention, the hub is composed of magnetically conductive material. This has the advantage of an increased braking.

In accordance with still a further feature of present invention, the electric motor is formed as a commutator motor with two brushes and the magnetic coil is connected with the brushes through a rectifier circuit formed as a bridge circuit. In this case the electric motor which is formed as a commutator motor is used for two driving directions. Despite the change of the current direction toward the brushes which is required for the rotary direction reverse, it is sufficient to connect the magnet coil of the arresting device permanently with the terminal conductors of the electric motor through the rectifying circuit.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single figure of the drawings is a view showing a drive unit in accordance with the present invention.

DESCRIPTION OF PREFERRED EMBODIMENTS

Figure 1:
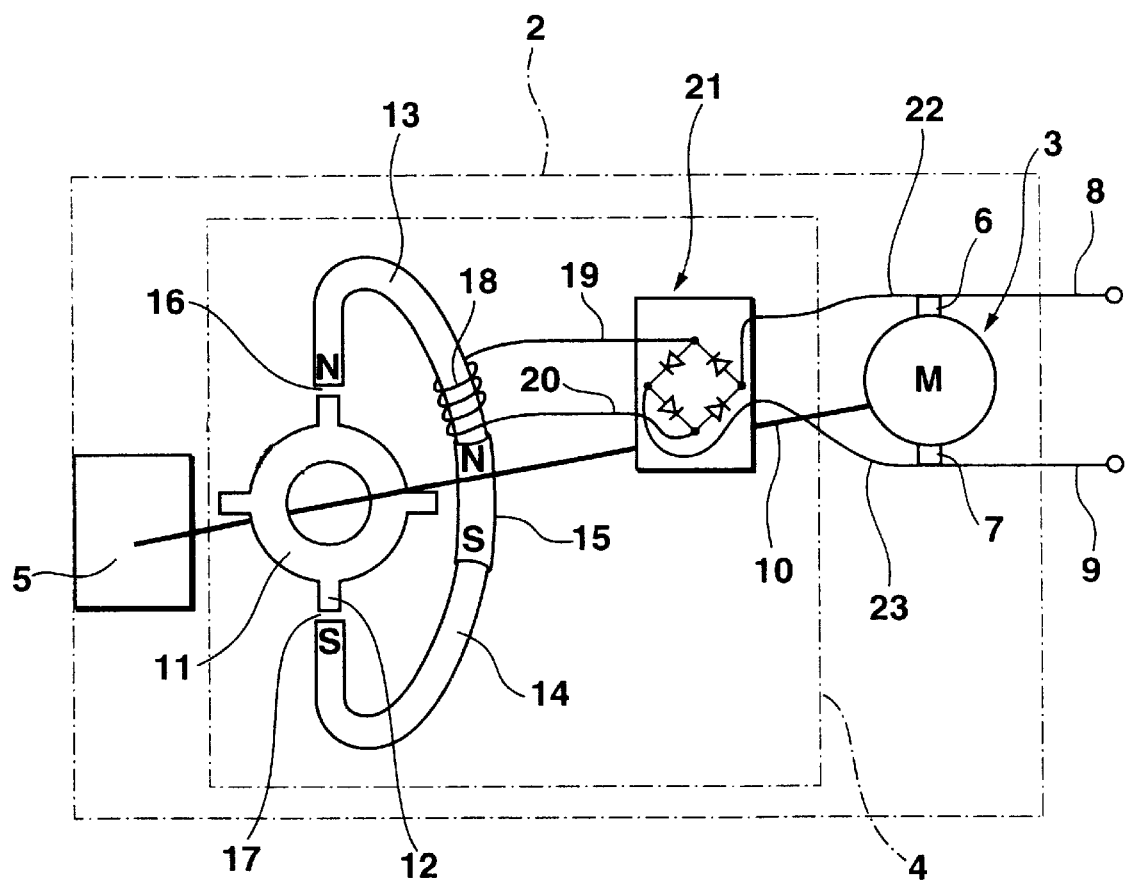

A drive unit in accordance with the present invention is identified with reference numeral 2. It has an electric motor 3, an arresting mechanism 4 and a transmission 5 which is formed for example as a screw (worm) transmission and is known from the prior art.

The electric motor 3 is formed here as a commutator motor with two brushes 6 and 7 and two terminal conductors 8 and 9 extending to the brushes 6 and 7. The electric motor is rotatable, for example, in two rotary directions depending on whether the terminal conductors 8 or 9 are supplied with the positive voltage. The application of a positive voltage to the terminal conductors 8 and 9 and correspondingly the potential of the corresponding other terminal conductor is not germaine to the present invention and therefore is not described in detail.

The electric motor 3 has a motor shaft 10 for transmitting a torque to the transmission 5 or directly to a not shown torque receiving element. A hub 11 which forms a component of the arresting mechanism 4 is non rotatably coupled to the motor shaft 10 and thereby to the transmission 5. For example, it has four arresting teeth 12 which extend radially from the hub 11 and are spaced from one another by identical angular distances. The hub 11 and the arresting teeth 12 are composed of a magnetically conductive material. Instead of the four arresting teeth 12 shown in the drawings, it is also possible to select any number of the arresting teeth.

A permanent-magnetic circuit is provided along a rotary path of the arresting teeth 12 formed during the rotation of the hub 11. The permanent-magnet circuit includes a first magnetic flux conducting part 13, a second magnetic flux conducting part 14 and a permanent magnet 15. The permanent magnet 15 has a north pole N and a south pole S. The magnet flux part 13 in orientation toward the arresting teeth 12 and the hub 11 provides a north pole N, while the magnet flux conducting part 14 in the region of the arresting teeth 12 provides a south pole S. As can be seen from the drawings, a magnet flux extends starting from the north pole through the magnet flux conductive part 13 as well the arresting teeth 12 oriented toward it, through the hub 11 and a further arresting tooth 12, as well as through the magnet flux conducting part 13.

Air gaps 16 and 17 are unavoidable and clearly shown in the drawings. In the shown orientation of the arresting teeth 12 toward the magnet flux conductive parts 13 and 14, the magnet flux lines extend the shortest through the air gaps 16 and 17. When due to the repelling or returning moment acting in the transmission 15 a rotation of the hub is performed, the arresting teeth 12 loose the shown orientation toward the magnetic field conductive parts 13 and 14 and the air gaps 16 and 17 become longer, while the magnetic field in the air gaps 16 and 17 is subjected to direction changes. This causes the returning moments opposite to the rotation of the hub 11, with the inventive desired action that undesirable rotations of the motor shaft 10 are limited to an angular size which is limited to an angle corresponding to the dimension of the arresting tooth 12 in the peripheral direction, divided by the distance of the arresting tooth 12 relative to a rotary axis of the hub 11 or the rotary axis of the motor shaft 10.

In order to overcome this arresting moment which is produced during the operation of the electric motor 3 not by the magnetic flux conductive parts 13 and 14 and the teeth 12, which required a disadvantageously great electric motor 3, a magnetic coil 18 is provided for at least partially compensating the magnetic flux produced by the permanent magnet 15. It is up to a designer to arrange this magnetic coil 18 around a magnetic flux conducting part 13 or 14 or around the permanent magnet 15, or to extend the magnetic coil 18 along all three above mentioned components.

In the shown embodiments the coil supply of the magnetic coil 18 is performed through coil ends 19 and 20 with interposition of a rectifier circuit 21 and intermediate conductors 22 and 23 from the terminal conductors 8 and 9 of the electric motor 3. As shown in the drawing, the rectifier circuit 21 is a so-called bridge circuit which acts so that the current flux direction through the magnetic coil 18 is always the same, regardless of whether a supply voltage with the sign plus is applied to the terminal conductor 8 or the terminal conductor 9. This provides, in accordance with the present invention, the advantage that with the electric motor which is operatable in two rotary directions as described hereinabove, for the supply of the magnetic coil 18 with an excitation current no additional switching elements are needed, such as for example relay contacts or semiconductor switching elements.

The components 11, 12, 13, 14, 15 form the arresting mechanism 4, while the magnetic coil 18 is designed so that timely, or in other words during the operation of the electric motor, the arresting force are at least reduced. The objective of a full elimination of the full arresting forces by the magnetic coil 18 does not have to be achieved. The achieving of the objective is also connected to the fact that the components tolerances with respect to dimensions and magnetic action must be maintained within very narrow limits, and due to variable temperature of the magnetic coil 18 additionally the current flow through the magnetic coil 18 must be regulated. All these features are too expensive, in particular when the inventive drive unit must be produced in a price favorable manner for displacement of window panes or sliding roofs or the same in the vehicles.

It will be understood that each of the elements described above, or two or more together, may also find a useful application in other types of constructions differing from the types described above.

While the invention has been illustrated and described as embodied in drive unit with electric motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drive unit, comprising an electric motor having a motor shaft; an electrically disengageable arresting mechanism including a hub connectable with said motor shaft, a plurality of arresting teeth radially projecting from said hub, and at least one arresting pin for electrical disengagement of an element composed of windings of an electrically conductive wire and for disengagement of electrical current, said arresting teeth being composed of a magnetically conductive material, said at least one arresting pin being arranged stationary and forming a component of a permanent-magnetic circuit relative to whose poles said arresting teeth are oriented one after the other, said electrically conductive wire being wound to form a magnetic coil which forms at least a partial length of said permanent-magnetic circuit so as to provide a temporary at least partial compensation of a permanent magnetic flux of said permanent-magnetic circuit, said electric motor being formed as a DC-driven commutator motor with two brushes and with two terminal conductors connected to said two brushes, said DC-driven commutator motor being reversible by changing polarities of said two terminal conductors, said magnetic coil being connected with said two brushes through a rectifier circuit formed as a full bridge circuit having four diodes.

2. A drive unit as defined in claim 1, wherein said permanent-magnetic circuit has a pole pair including a north pole and a south pole, said arresting teeth extending angularly from said hub and being oriented so that they form simultaneously a pair oriented toward said pole pair.

3. A drive unit as defined in claim 1, wherein said hub is composed of a magnetically conductive material.

* * * * *